United States Patent [19]

Shono

[11] 3,961,343

[45] June 1, 1976

[54] METHOD AND ARRANGEMENT FOR MANUAL STOP-DOWN MIRROR-UPS OF SINGLE LENS REFLEX CAMERA

[75] Inventor: Tetsuji Shono, Ranzan, Japan

[73] Assignee: Asahi Kogaku Kogyo Kabushiki Kaisha, Tokyo, Japan

[22] Filed: Apr. 14, 1975

[21] Appl. No.: 568,106

[52] U.S. Cl. ............................. 354/156; 354/272
[51] Int. Cl.² ................................. G03B 19/12
[58] Field of Search ............ 354/156, 152, 272, 153

[56] References Cited
UNITED STATES PATENTS

| | | | |
|---|---|---|---|
| 3,643,572 | 2/1972 | Kurei | 354/156 |
| 3,829,872 | 8/1974 | Ueda et al. | 354/156 |
| 3,893,141 | 6/1975 | Uno et al. | 354/156 |
| 3,906,519 | 9/1975 | Ueda et al. | 354/156 x |

Primary Examiner—L. T. Hix
Assistant Examiner—E. M. O'Connor
Attorney, Agent, or Firm—McNenny, Farrington, Pearne & Gordon

[57] ABSTRACT

A control assembly and method are disclosed for providing manual stop-down mirror-up operations in a single lens reflex camera having a camera ready condition wherein an automatic diaphragm arrangement normally biases a diaphragm operating member to a full open position and a quick-return mirror arrangement normally biases a mirror to a viewing position. The control includes a button externally mounted on the camera for manual rotational movement between first and second button positions and for manual depressing operation in each of the button positions. In the first button position, depression of the button biases the diaphragm operating lever to a stop-down position with the mirror in the viewing position and release of the button returns the diaphragm lever to the normal full open position. In the second button position, depression of the button again provides the stop-down operation and also biases the mirror to a mirror-up shutter operating position. A button lock is provided at the end of the depression stroke in the second button position to retain the stop-down and mirror-up condition. The button lock is disengaged and the camera is returned to its camera ready condition upon manual rotational movement of the button to its first position.

11 Claims, 7 Drawing Figures

METHOD AND ARRANGEMENT FOR MANUAL STOP-DOWN MIRROR-UPS OF SINGLE LENS REFLEX CAMERA

BACKGROUND OF THE INVENTION AND PRIOR ART

The present invention generally relates to a method and arrangement for manual stop-down mirror-up operation in a single lens reflex camera.

In view of practical considerations, single lens reflex cameras are currently provided with an automatic diaphragm arrangement and a quick-return arrangement for purposes of viewing the effect of diaphragm operation within the viewfinder. In order to stop down the normally fully open diaphragm within the lens arrangement before the photographing operation, the lens barrel or the camera main body is provided with a manually operating member. By manually operating this member, the diaphragm within the lens arrangement is individually stopped down. In cases in which mirror shocks should be avoided to as great an extent possible, such as microscopic photography, copying photography, and similar camera applications, or in cases in which no long mechanical back can be obtained in the design such as in the use of super wide angle lenses or the like, the camera main body is provided with a manually operating member for purposes of swinging the mirror from the viewing position to the shutter operation position.

In cameras having split-exposure shutters such as focal plane shutters, if the shutter is caused to run before completion of lens stop-down operation, it is possible that an undesirable unevenness of the picture will result. At the time of mirror-up, the mirror has already swung to the shutter operation position, and the automatic diaphragm arrangement and the shutter device disengaging arrangement tend to operate too early and without allowing sufficient time for moving the mirror. Thus, in order to avoid an unevenness of picture, it is desirable to arrange for the diaphragm operating member to be at a stop-down position at the time of mirror-up.

In resolution of the foregoing problems, the present invention provides mirror-up and manual stop-down operations through depression of a single button. The advantages of the method and arrangement for manual stop-down, mirror-up of a single lens reflex camera according to the present invention are that the operation for mirror-up is simple, only a single member is added to the outer camera appearance, comparatively few components are required, and the components require a comparatively small space.

DETAILED DESCRIPTION OF THE DRAWINGS

With reference to the drawings, a diaphragm operating arrangement and a mirror-up operation arrangement to which the present invention can be suitably applied is initially described below.

Figure 1:
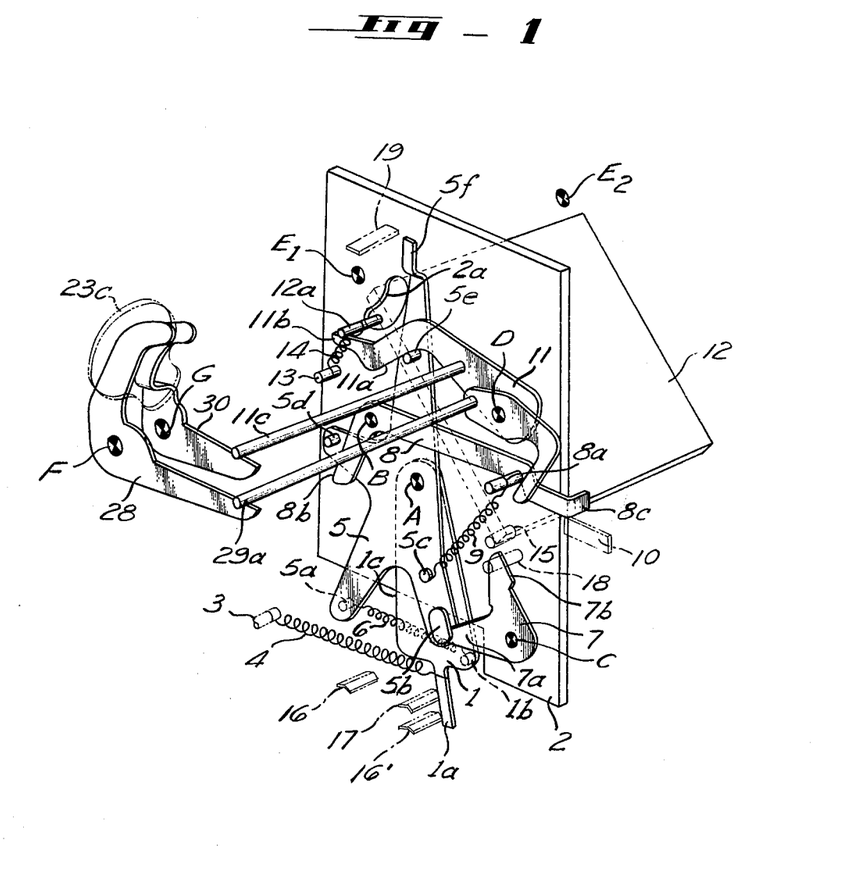
FIG. 1 is a perspective view of a mirror box arrangement of a camera having a manual stop-down mirror-up arrangement in a condition prior to operation in accordance with the present invention, with parts omitted for purposes of clarity.
Figure 2:
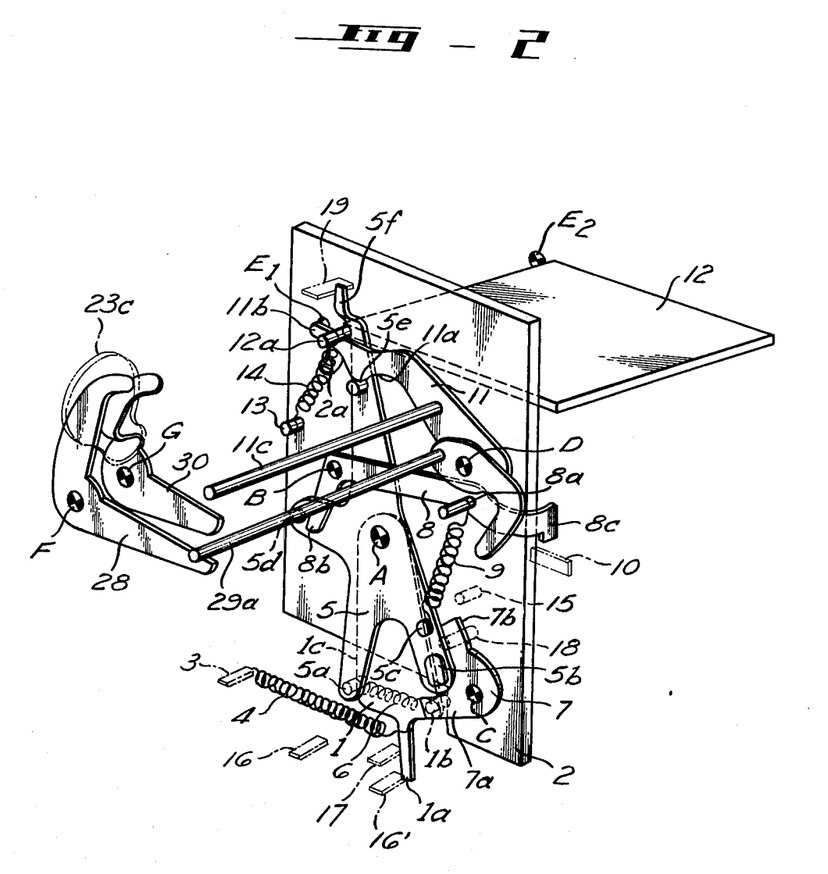
FIG. 2 is a perspective view similar to FIG. 1 depicting the arrangement in the shutter operation position.

In FIGS. 1 and 2, a charge lever 1 is rotatable about a shaft A fixed to a mirror box main body 2 and is urged normally clockwise about the shaft A by a return spring 4 arranged between an end portion 1a and a projection 3 fixed to a camera main body (not shown). The charge lever 1 is provided on its reverse side with a projection 1b. An operating lever 5, which is rotatable about the shaft A and overlies the charge lever 1, is also provided on its reverse side with a projection 5a. Between the projections 1b and 5a there is arranged a power spring 6 so that the charge lever 1 is urged clockwise while the operating lever 5 is urged counterclockwise.

Figure 3:
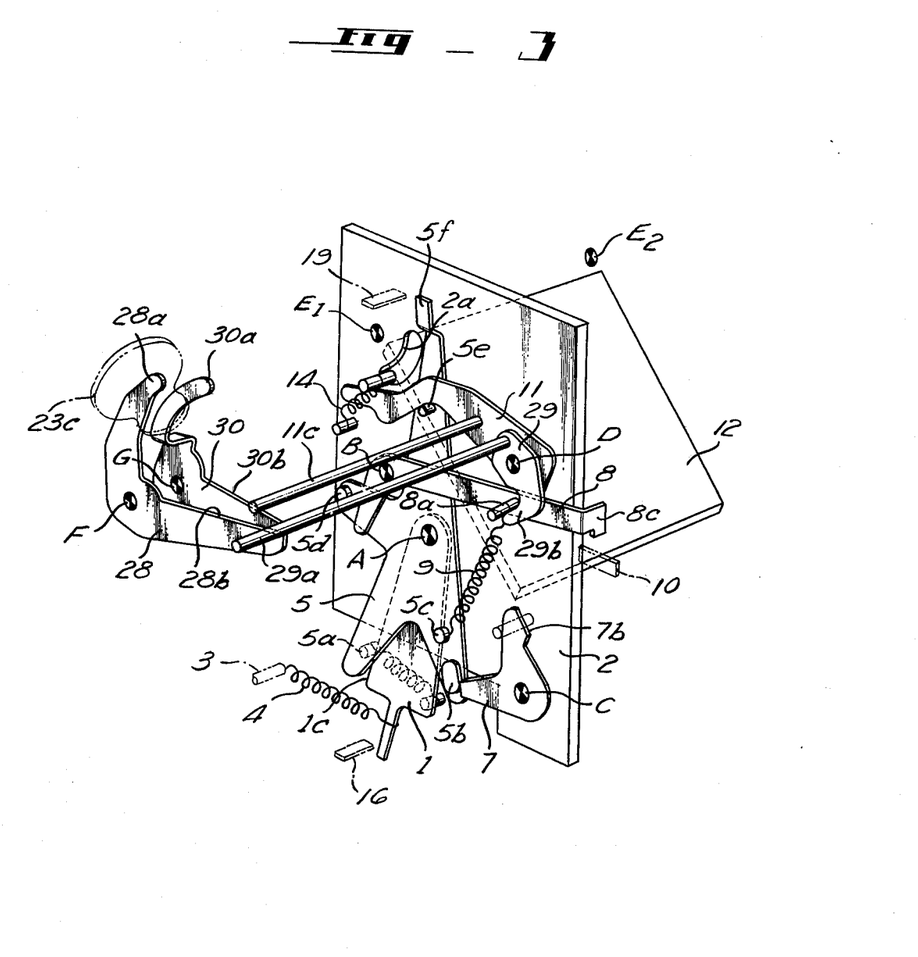
FIG. 3 is a perspective view similar to FIG. 1 depicting the arrangement in a manual stop-down operation.

In the state of FIG. 3, the end portion 1c of the charge lever 1 abuts against the projection 5a so that the power spring 6 does not contract more than the state of FIG. 3. An engaging lever 7 is rotatably pivoted to a shaft C fixed to the mirror box main body 2. In FIG. 1, the end portion 7a of this lever abuts against an engaging plate 5b fixed to the operating lever 5. The operating lever 5 is provided with a projection 5c. An automatic diaphragm rod 8 is rotatable about a shaft B fixed to the mirror box main body 2 and is provided on one end portion thereof with a projection 8a. Between the projections 5c and 8a there is provided a stop-down spring 9 so that the automatic diaphragm rod 8 is urged clockwise. A projection 5d fixed to the operating lever 5 abuts against a cam surface 8b at one end portion of the automatic diaphragm rod 8, so that the position of the automatic diaphragm rod 8 is determined by the position of the projection 5d and it does not further rotate in a clockwise direction.

An automatic diaphragm plate 10 of an interchangeable lens (not shown) is normally urged upward in FIG. 1. A so-called normal stop-down system is so arranged that an upward movement of the automatic diaphragm plate 10 causes the diaphragm blades of the interchangeable lens (not shown) to be closed. An end portion 8c of the automatic diaphragm rod 8 abuts against the automatic diaphragm plate 10 as shown in FIG. 1. Since the downward bias of the end portion 8c due to the action of the stop-down spring 9 is greater than the upward bias of the automatic diaphragm plate 10, the position of the automatic diaphragm plate 10 is determined by the position of the end portion 8c.

A mirror-up lever 11 is rotatable about a shaft D fixed to the mirror box main body 2 and provided with a cam surface 11a which abuts against a projection 5e of the operating lever 5 when this lever 5 rotates counterclockwise. Thus, counterclockwise rotation of the operating lever 5 causes clockwise rotation of the mirror-up lever 11.

A mirror 12 is rotatable about shafts $E_1$ and $E_2$ fixed to the mirror box main body 2. A projection 12a is fixed to the mirror 12 and projects through a cocoonshaped hole 2a of the mirror box main body 2. Between the projection 12a and a projection 13 fixed to the mirror box main body 2 there is arranged a mirror return spring 14 which urges the mirror 12 in a clockwise direction. A mirror stopper 15 fixed to the reverse side of the mirror box main body 2 stops the mirror 12 at the position shown in FIG. 1.

When the wind-up lever of the camera (not shown) is actuated, the charge member 16 first moves to the right from the dot-and-dash line position to the dot-dot-and-dash line position shown at 16' of FIG. 1 and then returns to the left up to the dot-and-dash line position. In this operation, when the charge member 16 first moves to the right so that the charge lever 1 rotates counterclockwise from the state of FIG. 3 to the state of FIG. 1, an engaging member 17, which moves within a plane which is perpendicular to the plane containing the charge lever 1, enters an engaging position so that the charge lever 1 is held in the state of FIG. 1.

At this time, the operating lever 5 is urged counterclockwise by the power spring 6. Since the engaging plate 5b abuts against the end portion 7a of the engaging lever 7, further counterclockwise rotation is prevented and the power spring 6 is extended from the state of FIG. 3 to the state of FIG. 1 so as to store energy. The return spring 4 is also extended in the same manner.

When the release button of the camera (not shown) is depressed for photographing operation, a disengaging member 18 moves downward from the state of FIG. 1 to the state of FIG. 2. Accordingly, a force is applied to an edge 7b of the engaging lever 7 which abuts against the member 18, so that the engaging lever 7 makes a counterclockwise rotation. As a result, as shown in FIG. 2, the engaging plate 5b is disengaged from the end portion 7a and due to the action of the power spring 6 the operating lever 5 rotates counterclockwise.

The counterclockwise rotation of the operating lever 5 causes the projection 5d to act on the cam face 8b so that the automatic diaphragm rod 8 is caused to make a counterclockwise rotation against the action of the stop-down spring 9. This causes an upward withdrawal of the end portion 8c, so that the automatic diaphragm plate 10 moves upward owing to the action of the spring in the arrangement of the interchangeable lens, thus completing diaphragm blade stop-down operation.

The counterclockwise rotation of the operating lever 5 also causes clockwise rotation of the mirror-up lever 11, so that the end portion 11b of the lever 11 abuts against the projection 12a of the mirror 12. Then, the mirror 12 is caused to make counterclockwise rotation against the action of the mirror return spring 14. As a result, the mirror 12 is swung up from the state of FIG. 1 to the state of FIG. 2.

Further, the counterclockwise rotation of the operating lever 5 causes the end portion 5f of the lever 5 to move to the left. This in turn causes a shutter arrangement engaging member 19 to be moved to the position of FIG. 2, so that the shutter arrangement begins to operate.

In the return operation, a shutter arrangement action completion signal is transmitted to the engaging member 17 so that the member 17 is withdrawn. As a result, owing to the action of the return spring 4 the charge lever 1 rotates clockwise, and the operating lever 5 also rotates clockwise. Thus, in entirely the reverse order to the aforementioned operation, every member of the arrangement returns to its initial state. Thus, the end portion 7a of the engaging lever 7 abuts against the engaging plate 5b and the preparation for the next wind-up operation has been completed.

The manual stop-down mirror-up arrangement according to the present invention and utilized in connection with the above mentioned diaphragm operating arrangement and mirror-up operation arrangement is described in detail below.

Figure 5:
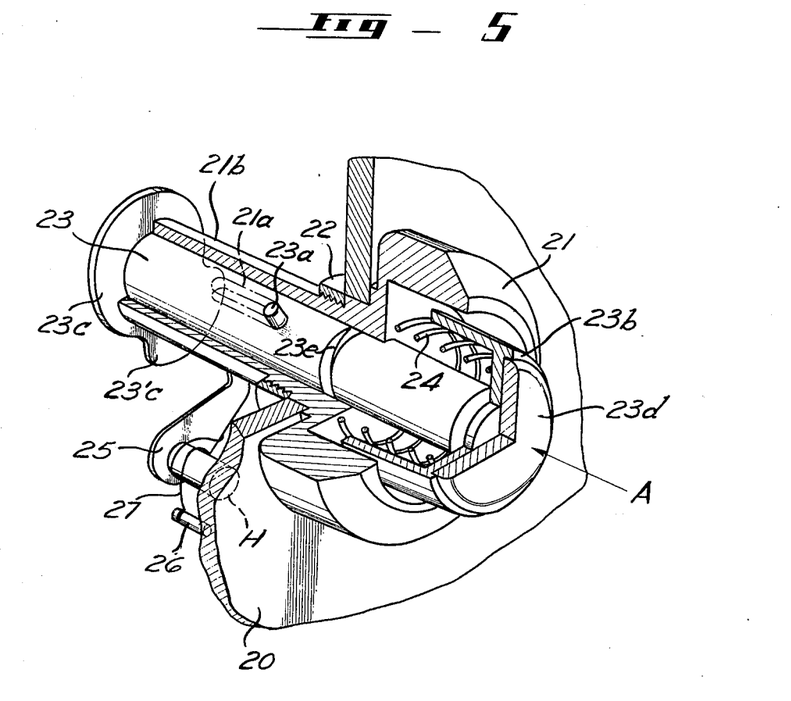
FIG. 5 is a perspective view of an operating button for the manual stop-down mirror-up arrangement with parts broken away for purposes of illustration.

In FIG. 5, a numeral 20 denotes the camera main body. A stop-down mirror-up change-over ring 21 is rotatably attached to the camera main body 20 through a nut 22. A button shaft 23 loosely fits in the change-over ring 21. A guide pin 23a fixed to the button shaft 23 engages a guide groove 21a (shown in dot-dot-and-dash lines) of the change-over ring 21, so that in an angular direction the change-over ring 21 and the button shaft 23 move as one body, while in an axial direction the button shaft 23 can move relative to the change-over ring 21 within the range which is determined by the guide groove 21a and the guide pin 23a. Between a button main body 23b fixed to the button shaft 23 and the change-over ring 21 there is arranged a button return spring 24 so that the button shaft is normally urged toward the reader in the return direction as shown in FIG. 5.

Figure 6A:
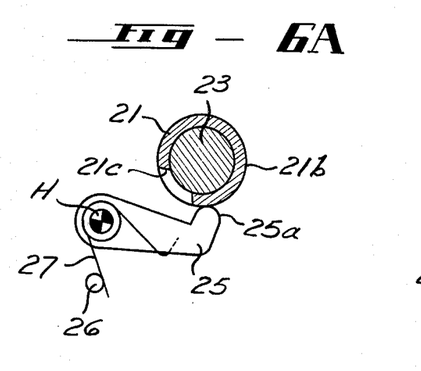
FIG. 6A is an elevational view, partially in section, illustrating the locking arrangement of the operating button shown in FIG. 5.

The button shaft 23 is provided on the rear end thereof with a plate 23c of the shape of approximately the figure eight including a projecting portion 23'c. As the button shaft 23 rotates, the plate 23c occupies either of two positions as shown in dot-dot-and-dash lines in FIGS. 3 and 4. A lock lever 25 is rotatably pivoted to the shaft H fixed to the camera main body 20, and is normally urged counterclockwise by a torsion spring 27 which is wound around the shaft H. A first end of the torsion spring 27 engages the lock lever 25 and the other end of the spring engages a projection 26 fixed to the camera main body 20. In FIG. 6A, the lock lever 25 abuts against the outer peripheral portion 21b of the change-over ring 21, thus stopping in unlocking state.

In the stop-down operation as shown in FIG. 5, when the button head portion 23d fixed to the button shaft 23 is depressed in the direction of the arrow A, the button shaft 23 moves backward so that the plate 23c also moves backward. At this time, as shown in FIG. 3, the plate 23c abuts against an end edge 28a of a stop-down intermediate lever 28 which is rotatably pivoted to a shaft F fixed to the camera main body (not shown). Then, the plate 23c causes the stop-down intermediate lever 28 to be rotated counterclockwise. This causes the edge 28b of the stop-down intermediate lever 28 to abut against a pin 29a fixed to one end of a stop-down lever 29 overlying the mirror-up lever 11 and rotatably pivoted to a shaft D, causing the stop-down lever 29 to be rotated clockwise. As a result, a cam 29b at one end portion of the stop-down lever 29 abuts against the projection 8a of the automatic diaphragm rod 8. In this case, the point of contact of the projection 8a and the cam 29b moves gradually toward the shaft D, so that, despite the increased extension of the stop-down spring 9, the force which is necessary for rotating the stop-down lever 29 clockwise gradually decreases. Accordingly, the automatic diaphragm rod 8 is rotated counterclockwise against the action of the stop-down spring 9, so that the end portion 8c moves upward and the automatic diaphragm plate 10 makes an accompanying movement, thus completing stop-down operation of an interchangeable lens.

When the button head portion 23d is released, each related member returns to its initial state through the actions of the button returning spring 24 and the stop-down spring 9, thus returning the interchangeable lens from the stopped-down state to the initial state.

Figure 4:
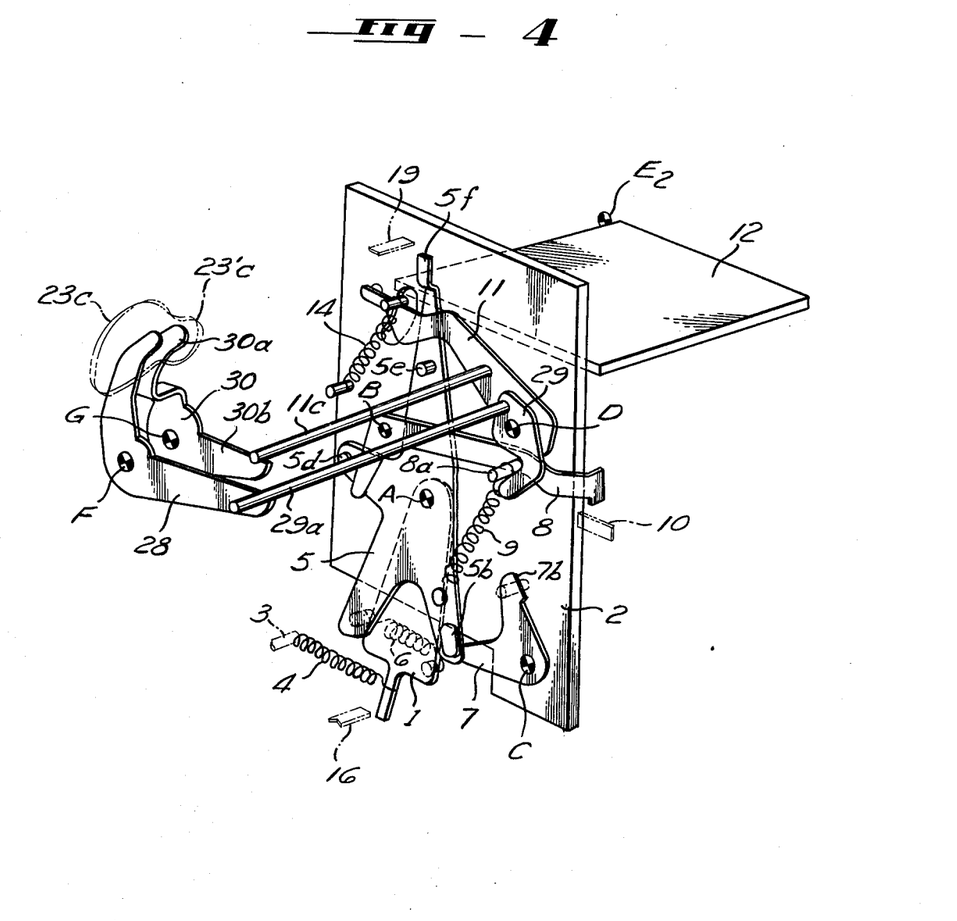
FIG. 4 is a perspective view similar to FIG. 1 depicting the arrangement in a manual stop-down mirror-up operation.

In the mirror-up operation, the change-over ring 21 is rotated counterclockwise as shown in FIG. 5, and the plate 23c is manually operated up to the dot-dot-and-dash line position. As a result, the plate 23c occupies the second position as shown in dot-dot-and-dash lines in FIG. 4. When the plate 23c is manually pushed backward in the direction of the arrow in entirely the same manner as individually stop-down operation, the end portion 8c of the automatic diaphragm rod 8 moves upward so that stop-down operation of an interchangeable lens is carried out in entirely the same manner as that described above. At the same time, since the change-over ring 21 has been previously rotated counterclockwise, as shown in FIG. 4 the projecting portion 23'c of the plate 23c abuts against the end edge 30a of the mirror-up intermediate lever 30 which is rotatably pivoted to a shaft G of a camera main body (not shown). As a result, the mirror-up intermediate lever 30 is rotated counterclockwise. Another end edge 30b of the mirror-up intermediate lever 30 abuts against a pin 11c fixed to the mirror-up lever 11. As a result, the mirror-up lever 11 moves the mirror 12 to the "mirror-up" position against the action of the mirror return spring 14.

Figure 6B:
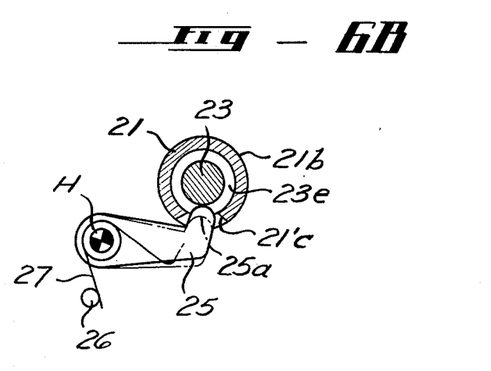
FIG. 6B is an elevational view similar to FIG. 6A illustrating the locking arrangement in a lock position.

Previous counterclockwise rotation of the change-over ring 21 causes change of the position of the ring 21, from that of FIG. 6A to that of FIG. 6B. Due to the counterclockwise urge of the torsion spring 27, the end portion 25a of the lock lever 25 enters a cutout 21c, whose width is a little greater than the thickness of the lock lever 25, of the change-over ring 21. As a result, the lock lever 25 stops at such position that, as shown in FIG. 6B in dot-dot-and-dash lines, and the end portion 25a abuts against the button shaft 23.

Then, when the plate 23c is pushed backward in the direction of the arrow A in FIG. 5, in the last stage of the pushing operation when stop-down mirror-up operation has been completed, the groove 23e of the button shaft 23 comes to such position that the end portion 25a of the lock lever 25 can enter it. As a result, as shown in FIG. 6B, the end portion 25a enters the groove 23e and the lock lever 25 stops at the position as shown in solid line. Despite the returning actions of the stop-down spring 9, the mirror returning spring 14 and the button returning spring 24, when the button head portion 23d is released, the button shaft 23 is locked in the depressed position. In photographing operation under these conditions, that is, in photographing operation under conditions of stopped-down and mirror-up state, in FIG. 1 the release causes the end portion 5f of the operating lever 5 to act on the shutter arrangement engaging member 19; and after completion of shutter operation, through the action of the return spring 4, all the members are returned to the initial state except the mirror-up lever 11, the mirror 12, the stop-down lever 29 and the automatic diaphragm rod 8. Accordingly, the mirror-up stopped-down state is retained; and the quick-mirror-up stop-down operation can be carried out independent of whether it is before or after the wind-up operation of the camera.

In the return from mirror-up stopped-down state to the initial state, the change-over ring 21 is rotated clockwise by the same angular amount as it has been rotated counterclockwise so as to bring the arrangement from the state of FIG. 6B to FIG. 6A. In FIG. 6B, when, due to the rotation of the change-over ring 21, the button shaft 23 begins to rotate clockwise, first the end portion 25a of the lock lever 25 abuts against the wall portion 21'c of the cutout 21c. Further clockwise rotation of the change-over ring 21 causes the lock lever 25 to be rotated clockwise about the shaft H against the friction between the cutout 21c and the end portion 25a and to be brought to the position as shown in dot-dot-and-dash lines in FIG. 6B. At this time, the end portion 25a is unlocked from the groove 23e, so that, owing to the actions of the button returning spring 24, the stop-down spring 9 and the mirror returning spring 14, the button shaft 23 returns automatically.

Further counterclockwise rotation of the change-over ring 21 causes the end portion 25a to abut against the outer peripheral portion 21b at the position as shown in FIG. 6A. For this reason, the lock lever 25 does not abut against the button shaft 23 at all, at the time of manual stop-down operation the button shaft 23 is not locked, and no force through the lock lever 25 is applied to the button shaft 23.

Thus, the whole arrangement of the mirror box returns to its initial state. It is clear that the above mentioned operation may be made either before or after wind-up operation of the camera or during shutter release operation.

In this arrangement, the operation lines of the forces acting on members are all contained in planes which are parallel to the side of the mirror box to which side the arrangement is attached so that efficient transmission of forces is obtained. A mechanical advantage is obtained through the fact that the intermediate members between the manual operation member and the mirror box arrangement are fundamentally two members of the stop-down and mirror-up intermediate levers 28 and 30, and that these intermediate levers 28 and 30 are two levers of similar shape placed in side by side relation so that only small space is necessary.

In the arrangement as shown in FIG. 5, it is preferable to arrange angular regulation or click arrangement between the change-over ring 21 and the camera main body 20. Further, it will be additionally necessary that in positions other than stop-down position or mirror-up stop-down position the button head portion 23d is under action of a stopper so that it can not be depressed.

Thus, according to the present invention, depression of a single button provides manual stop-down and mirror-up operations. The mirror-up operation is necessarily accompanied by the stop-down operation so as to eliminate the possiblity of producing an unevenness of the picture. Further, the manual stop-down mirror-up operations are simplified and achieved with a decreased number of elements.

What is claimed is:

1. A control assembly for manual stop-down mirror-up operations of a single lens reflex camera having a camera ready condition wherein an automatic diaphragm arrangement normally maintains a diaphragm operating member in a full open position and a quick-return mirror arrangement normally maintains a mirror in a viewing position comprising manually operable button means externally mounted on the camera for manual non-depressing movement between first and second button positions and for manual depressing operation in said first and second button positions, said button means being operatively engageable with said automatic diaphragm arrangement in said first button position to bias said diaphragm operating member from said normal full open position to a stop-down position with said mirror in said viewing position upon manual operation of said button means in said first button position and to cause the return of said diaphragm operating member to said normal full open position upon completion of the manual operation of said button means in said first button position, said button means being operatively engageable with said automatic diaphragm arrangement and said quick-return mirror arrangement in said second button position to bias said diaphragm operating member from said normal full open position to said stop-down position and said mirror from said normal viewing position to a mirror-up shutter operating position upon manual operation of said button means in said second button position.

2. A control assembly as set forth in claim 1 wherein said button means include locking means in said second button position for maintaining said diaphragm operating member in said stop-down position and said mirror in said mirror-up shutter operating position, and said locking means include lock disengaging means to cause said diaphragm operating member to return to said normal full open position, said mirror to return to said normal viewing position, and said camera to thereby assume said camera ready condition upon manual movement of said button means from said second button position to said first button position and completion of manual operation.

3. A control assembly as set forth in claim 2 wherein said button means include resilient means to cause the return of said camera to said camera ready condition upon completion of the manual operation of said button means in said first position.

4. A control assembly as set forth in claim 3 wherein said button means include button shaft means axially, manually movable upon depression of said button means during manual operation in said first and second button positions and rotationally, manually adjustable for movement of said button means between said first and second button positions.

5. A control assembly as set forth in claim 4 wherein said button shaft means include radially extending means for operatively engaging said automatic diaphragm arrangement upon operation of said button means in said first button position and for operatively engaging both said automatic diaphragm arrangement and said quick-return mirror arrangement upon operation in said second button position.

6. A control assembly as set forth in claim 5 wherein said resilient means are arranged to axially bias said button shaft means to disengage said radially extending means and to cause the return of said camera to said camera ready condition upon completion of the manual operation of said button means in said first button position.

7. A control assembly as set forth in claim 5 wherein said radially extending means is arranged to operatively engage a rotationally movable, intermediate diaphragm operating lever and a rotationally movable, intermediate mirror operating lever, each of said levers being rotationally movable in planes substantially parallel to the plane of rotation of said diaphragm operating lever and to the plane of rotation of a mirror operating lever of said quick-return mirror arrangement.

8. A control assembly as set forth in claim 5 wherein said button shaft means include an axially movable shaft mounted within an axially fixed sleeve shaft adapted to be carried by the camera, said shafts being secured to one another for corresponding rotational movement upon manual adjustment of said button means between said first and second button positions, and said radially extending means comprise a plate member secured to said axially movable shaft adjacent an axial end thereof.

9. A control assembly as set forth in claim 8 wherein said locking means comprise a recess in said axially movable shaft engageable by lever means extending through an opening in said axially fixed sleeve shaft upon depression of said button means in said second button position.

10. A method for providing manual stop-down mirror-up operations in a single lens reflex camera having a camera ready condition wherein an automatic diaphragm arrangement normally maintains a diaphragm operating member in a full open position and a quick-return mirror arrangement normally maintains a mirror in a viewing position comprising providing button means externally mounted on the camera for manual non-depressing movement between first and second button positions and for manual depressing operation in said first and second button positions; operatively engaging and biasing said diaphragm operating member from said normal full open position to a stop-down position with said mirror in said viewing position upon manual operation of said button means in said first button position and causing said camera to return to said camera ready condition upon completion of the manual operation; and operatively engaging and biasing said diaphragm operating member from said normal full open position to a stop-down position and said mirror from said normal viewing position to a mirror-up shutter operating position upon manual operation of said button means in said second button position.

11. A method as set forth in claim 10 wherein said engaging and biasing step in the second button position includes the further step of engaging locking means to lock said diaphragm operating member in said stop-down position and said mirror in said mirror-up shutter operating position, and disengaging said locking means by manually moving said button means to said first button position to cause said diaphragm operating member to return to said normal full open position, said mirror to return to said normal viewing position, and said camera to return to said camera ready condition.

* * * * *

UNITED STATES PATENT AND TRADEMARK OFFICE
CERTIFICATE OF CORRECTION

PATENT NO. : 3,961,343
DATED : June 1, 1976
INVENTOR(S) : Tetsuji Shono

It is certified that error appears in the above—identified patent and that said Letters Patent are hereby corrected as shown below:

Front page, insert the following priority information:

Foreign Application Priority Data

April 17, 1974   Japan ............... 1974-42298

Signed and Sealed this

Twenty-eighth Day of September 1976

[SEAL]

Attest:

RUTH C. MASON
*Attesting Officer*

C. MARSHALL DANN
*Commissioner of Patents and Trademarks*